(Model.) 5 Sheets—Sheet 1.

W. J. EDWARDS & G. B. DURKEE.
GRADING AND DITCHING MACHINE.

No. 275,614. Patented Apr. 10, 1883.

Witnesses:
Albert H. Adams.
Edgar P. Bond.

Inventors:
William J. Edwards.
George B. Durkee.
By West & Bond.
Their Attys.

(Model.)   5 Sheets—Sheet 2.
W. J. EDWARDS & G. B. DURKEE.
GRADING AND DITCHING MACHINE.
No. 275,614.   Patented Apr. 10, 1883.
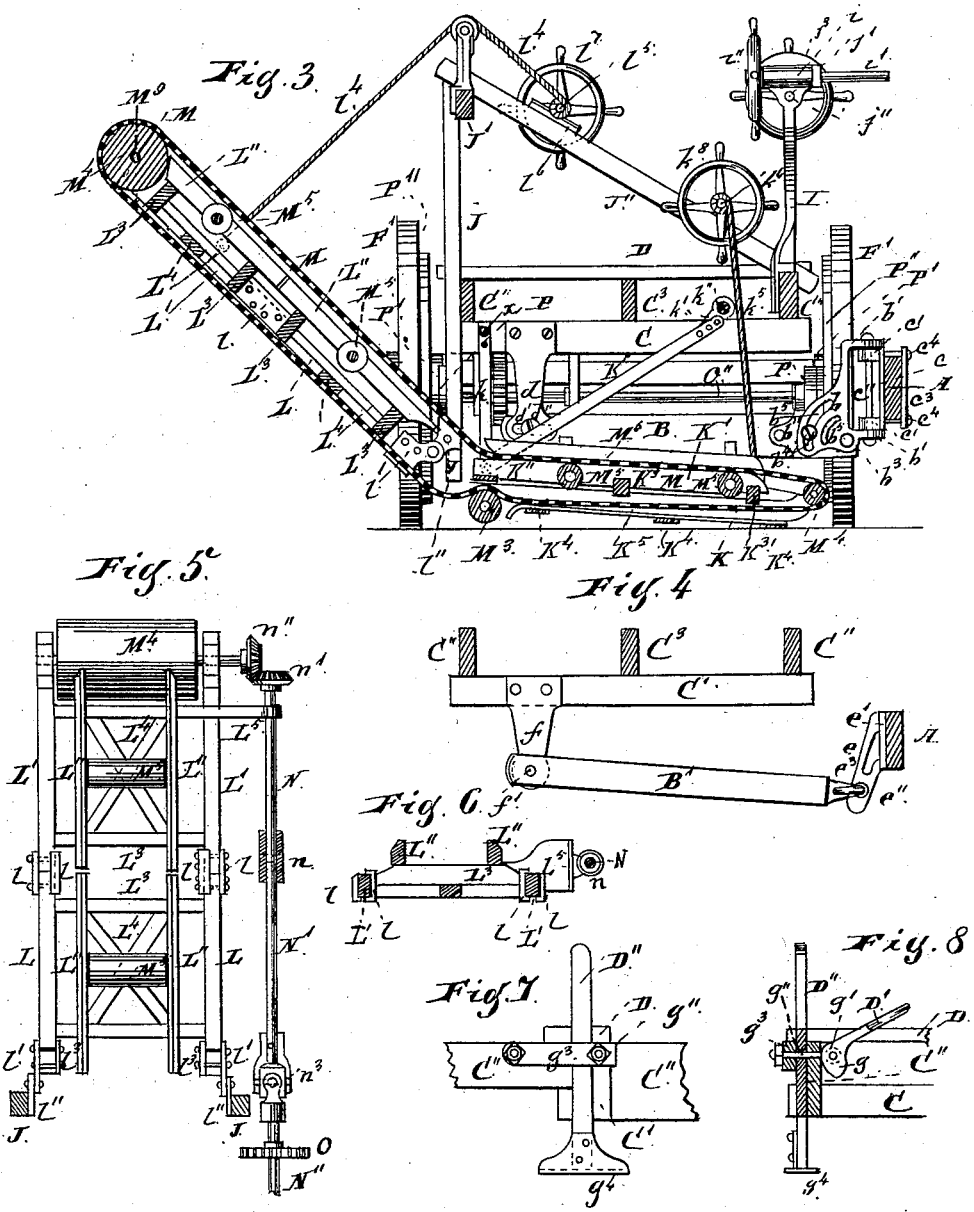
Witnesses:
Albert H. Adams.
Edgar J. Boyd.
Inventors:
William J. Edwards.
George B. Durkee.
By West & Bond.
Their Attys.

(Model.)  5 Sheets—Sheet 3.

W. J. EDWARDS & G. B. DURKEE.
GRADING AND DITCHING MACHINE.

No. 275,614.  Patented Apr. 10, 1883.

Witnesses:
Albert H. Adams
Edgar T. Bond

Inventors:
William J. Edwards
George B. Durkee
By West & Bond
Their Attys.

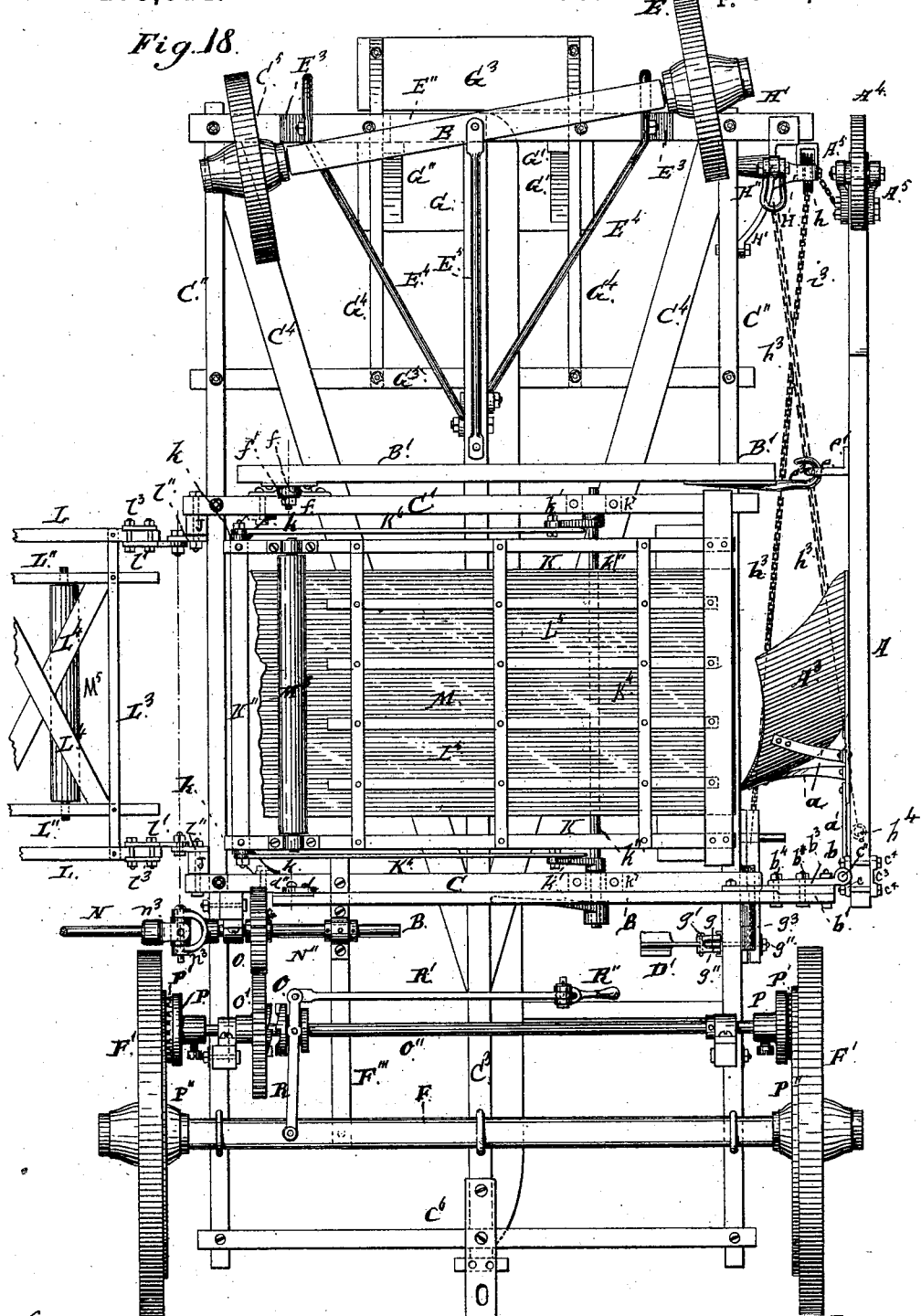

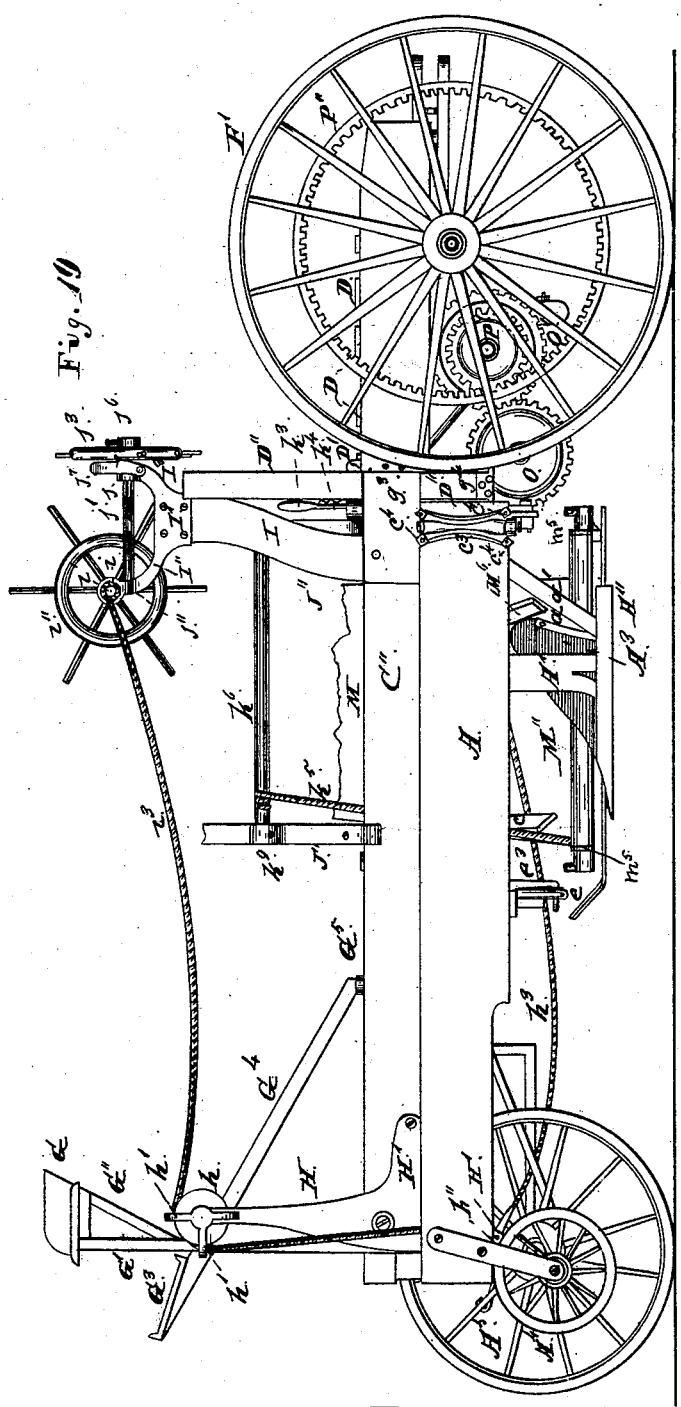

UNITED STATES PATENT OFFICE.

WILLIAM J. EDWARDS AND GEORGE B. DURKEE, OF CHICAGO, ILLINOIS, ASSIGNORS TO SAID EDWARDS.

GRADING AND DITCHING MACHINE.

SPECIFICATION forming part of Letters Patent No. 275,614, dated April 10, 1883.

Application filed April 14, 1880. (Model.)

*To all whom it may concern:*

Be it known that we, W. J. EDWARDS and GEO. B. DURKEE, of the city of Chicago, in the county of Cook and State of Illinois, have invented a new and valuable Improvement in Grading and Ditching Machines; and we do hereby declare that the following is a full, clear, and exact description of the construction and operation of the same, reference being had to the annexed drawings, making a part of this specification, and to the letters and figures of reference marked thereon.

Figure 1:
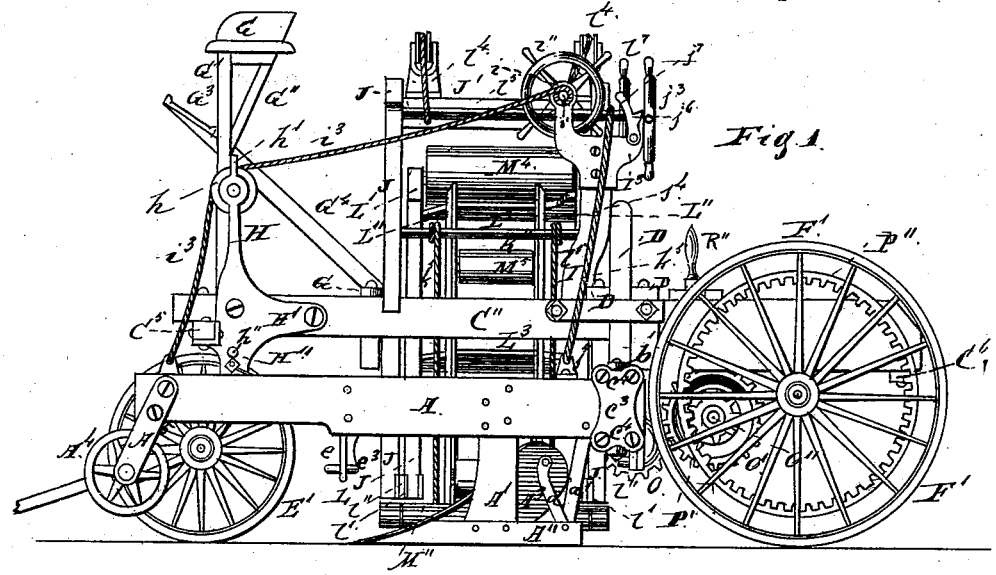
Figure 2:
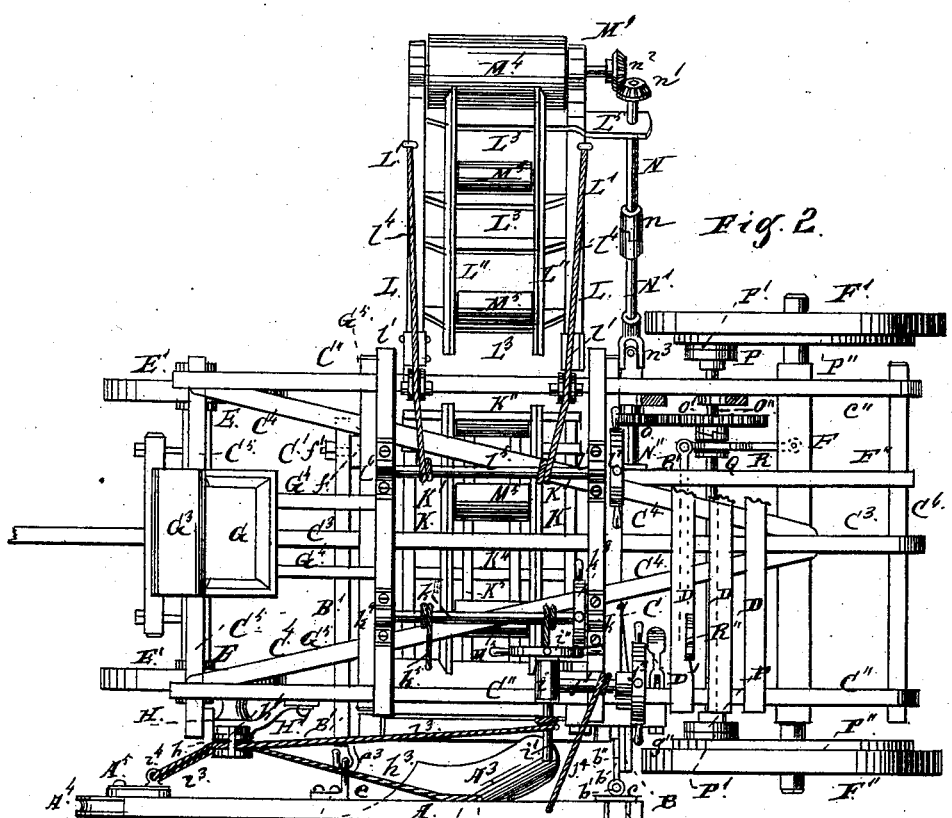
Figure 10:
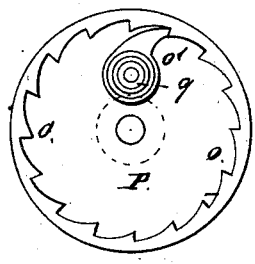
Figure 9:
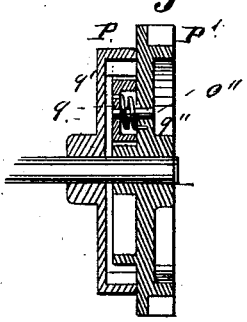
Figure 13:
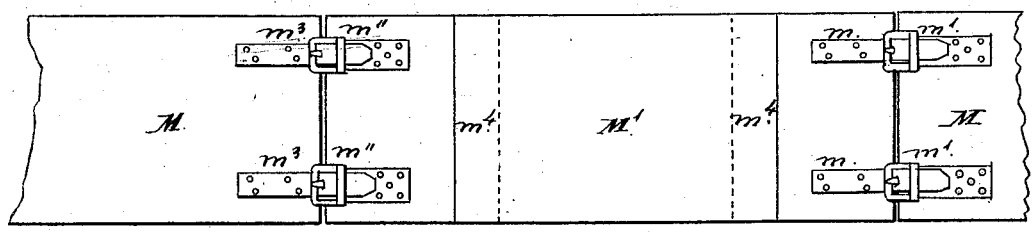
Figure 14:
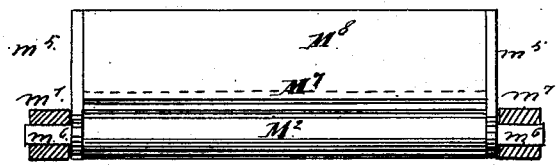
Figure 15:
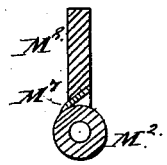
Figure 15A:
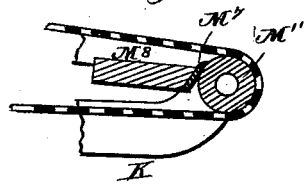
Figure 16:
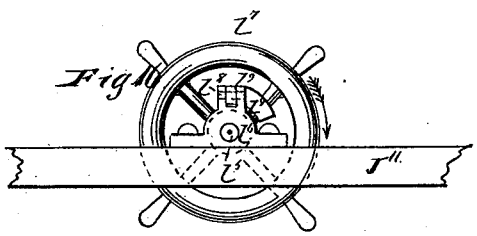
Figure 17:
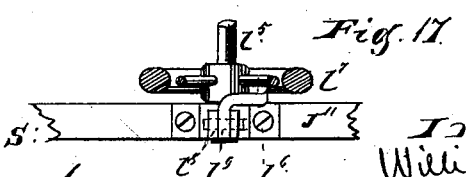

Figure 1 is a side elevation, showing the frame for the carrying-apron elevated; Fig. 2, a top or plan view; Fig. 3, a cross-section through the carrying-belt; Fig. 4, a detail showing the hanger for suspending the forward end of the plow-beam; Fig. 5, a detail showing the construction of the frame and driving devices for the carrying apron or belt; Fig. 6, a cross-section of the frame or support for the carrying belt or apron; Figs. 7 and 8, details of the devices for holding the plow down to its work in hard or baked soil; Figs. 9, 10, 11, and 12, details of the clutch for driving the carrying-belt from the rear carrying-wheels of the machine; Fig. 13, a detail showing the removable section of the carrying apron or belt; Figs. 14 and 15, details showing the inner roller of the carrying belt or apron and the scraper working in connection therewith. Fig. 15$^a$ is a section through a portion of the belt, the scraper, and outer roller; Figs. 16 and 17, details showing the hand-wheel and its catch or lock for raising and lowering the hinged section of the frame for the carrying apron or belt; Fig. 18, an under side view of the machine with the frame for the carrying belt or apron broken off; Fig. 19, a side elevation on a larger scale than Fig. 1, with the carrying belt or apron and its frame removed.

This invention relates to that class of grading and ditching machines in which the soil turned by the plow is deposited onto an endless belt or conveyer and delivered sidewise of the machine at the desired point; and it has for its object to prevent the plow from being raised in working in hard or baked soil or ground, and at the same time have the beam which carries the plow connected or suspended so as to give the plow perfect freedom and ease of movement to adapt itself to the inequalities of the ground, and also to prevent breakage in case of striking a hard or unyielding substance, and to improve the construction and operation of the carrying or conveying belt or apron, and prevent clogging of the belt from the sticking of the soil thereon, and to improve the means by which the carrying belt or apron and the plow-beam and plow are respectively raised and lowered or adjusted, as required, for working in different places, and to support the plow-beam and plow, and have the plow in position to coact with the carrying belt or apron at all times; and its nature consists in the several devices and combinations of devices, hereinafter more specifically described, and pointed out in the claims, by which the several results are attained.

In the drawings, A represents a plow-beam, made of a single piece of wood or other suitable material, of the required dimensions to support and carry the plow, which is attached thereto by a suitable standard, A', the upper end of which standard is bolted or otherwise attached to the beam, and the lower end supports the landside A'', mold-board A$^3$, and a plow-point, forming a plow of the usual construction; and in order to secure rigidity and firmness, the mold-board and landside are braced by suitable braces, $a$ $a'$, as shown in Figs. 1, 18, and 19, or in some other suitable manner. The forward end of the plow-beam is supported by a caster-wheel, A$^4$, which is hung in side plates or brackets, A$^5$, attached to the sides of the beam.

B is a bar, of wood or some other suitable material, the outer end of which sustains or supports the rear end of the plow-beam, to which it is connected by means of a hanger or bracket formed of a plate or casting, $b$, having on one side, at the top and bottom, ears $b'$, each having a suitable hole for the passage of a bolt, $c''$, which bolt also passes through ears $c'$ on a plate, $c$, located on the side of the plow-beam near the rear end, and held in position by bolts $c^4$, which pass through the plate $c$ and above and below the plow-beam, and also through a backing-plate, $c^3$, located on the opposite side of the plow-beam to the plate $c$.

The plate or bracket $b$ is provided with one or more curved slots, $b^5$, two being provided, as shown, through which a bolt, $b^4$, one for each slot, passes. These bolts $b^4$ pass through the outer end of the bar B and through a secondary plate, $b''$, located on the side of the bar B, which plate $b''$ forms a backing or guard against the wear of the bar B in adjusting the plow-beam A. The plate or bracket $b$ is further attached to the bar B by a bolt, $b^3$, which bolt forms a pivot for the bracket to turn on, such turning being permitted by the curved slot or slots $b^5$. This turning of the bracket on the bar B is necessary to allow the plow-beam to be turned at different angles to cause the plow to stand so as to be level in relation to the ground, to do its work properly on level, rolling, or inclined ground; and to set the plow at the proper inclination all that has to be done is to loosen the bolt or bolts $b^4$, turn the plate or hanger $b$, on its pivotal point $b^3$ until the desired inclination of the plow is reached, and then set the nuts of the bolt or bolts $b^4$ down, clamping the plate or bracket $b$, and holding it firmly in position. The form of the bracket or plate $b$, and the manner of connecting it with the plow-beam, can be varied from that shown; but this bracket or plate must be pivotally attached to the bar B and be provided with curved slots or other means, which will permit it to turn on its pivot to adjust the inclination of the plow. The devices shown for connecting the bracket with the plow-beam are very simple, and will be found sufficient for the purpose. The plate $b^4$ is only necessary to prevent the wearing of the bar B in making the adjustments. The inner end of the bar B is supported from a cross-bar, C, of the main frame of the machine by a hanger, $d$, the upper end of which is bolted or otherwise secured to the cross-piece C, and the lower end is provided with a slot, $d'$, through which a bolt, $d''$, passes, which bolt also passes through the inner end of the bar B, and by this mode of connecting or suspending the inner end of the bar B it will be seen that the bar has a slight lateral play to allow the plow to dodge in or out to pass obstructions.

B' is a bar, of wood or other suitable material, for suspending or carrying the forward end of the plow-beam, to which the outer end of the bar B' is connected by a plate or bracket, $e$, (see Fig. 4,) having a side extension or plate, $e'$, at its upper end, through which and the plow-beam suitable bolts are passed for attaching the bracket to the beam. The lower end of the bracket or plate $e$ is provided with an opening, $e''$, to receive a hook or eye, $e^3$, attached to the outer end of the bar B', making a loose connection between the plow-beam and the bar B', and at the same time forming a connection between the two which will maintain the beam in position in relation to the main frame of the machine and the carrying or conveying apron or belt. The inner end of the bar B' is suspended from a cross-piece, C', of the frame-work by a hanger, $f$, the upper end of which is bolted or otherwise fastened to the side of the piece C', and the lower end is provided with a hole, through which and the bar B' a bolt, $f'$, is passed, forming a pivotal connection for the inner end of the bar B', by which its outer or free end is free to rise and fall, while the outer or free end of the bar B is also free to rise and fall on the bolt $d''$, which forms a pivot for its inner end. By thus pivotally connecting the inner ends of the bars B B' it will be seen that the plow-beam, which is connected to their outer or free ends, is free to rise and fall, and at the same time the beam is suspended or connected so as to maintain a proper relation for the plow to deliver the soil on the receiving end of the carrying or conveying belt or apron.

C C' are cross-pieces; C'', side pieces; $C^3$, a central longitudinal piece; $C^4$, diagonal brace-pieces running from the rear of the center piece, $C^3$, to the forward end of the side pieces, C''; $C^5$, front cross-pieces; $C^6$, rear cross-piece. These pieces form the frame-work of the machine, which is mounted on wheels and supports the frame which carries the carrying-apron or conveyer, the plow-beam and its suspending devices, and the devices by which the plow-beam and the apron or conveyer are operated.

D represents cross-pieces secured to the upper faces of the pieces C'' $C^3$ at the rear end of the machine, and forming a platform for the operator to stand on when working the raising and lowering devices of the beam and the apron or conveyer.

D is a foot lever or treadle pivoted at its inner end to an eyebolt, $g''$, by a suitable pin or pivot, $g'$, and having at its inner end a cam or eccentric, $g$. (See Fig. 8.) The eyebolt, to which the treadle D' is pivoted, passes through the side piece C'' of the main frame and through the strap-piece $g^3$, between which strap-piece and the side piece is located a slide, D'', having at its lower end a plate or head, $g^4$, (see Fig. 7,) secured thereto in any suitable manner, which plate or head, when the parts are together, comes over the supporting-bar B, against which bar it can be brought in contact and hold the bar, and with it the plow-beam and plow, down to place, and prevent the plow from running out when working in hard or baked soil. This slide D'' thus forms a lock to prevent the plow from rising, and when acting as a lock it is held in any position in which it may be adjusted by the operator placing his foot on the treadle D' and bearing down thereon, bringing the cam-head or eccentric $g$ into contact with the face of the side piece C'', drawing the bolt $g''$ inward, and forcing the strap or retaining-piece $g^3$ tightly against the slide D'', holding the slide firmly between the strap or retaining-piece $g^3$ and the side piece C''. When working in ordinary ground, where it is not necessary to have the plow held down, the foot-treadle D' is released, allowing the slide to move up and down freely, so that the plow can rise and fall as required for the lay of the ground. It will be seen that by thus using the slide D″, which, by means of the foot-treadle, D′, form a friction-stop, the entire weight of the machine can be utilized in holding the plow down to its work in heavy, hard, or baked soil, as when the slide D″ is locked through the foot-treadle D′ it becomes a part of the frame, and cannot rise without the entire machine is elevated bodily.

E is the forward axle, having suitable spindles at each end to receive the wheels E′, and supporting the forward end of the machine through the bolster formed by the horizontal piece E″ and diagonal brace-pieces E³, connecting the horizontal piece E″ with the front cross-piece, C⁵, of the main frame; and in order to give the necessary rigidity to the bolster, diagonal brace-rods E⁴ are provided running from the center longitudinal piece, C³, to the horizontal piece E‴, and a longitudinal brace rod or strap, E⁵, extending from the center-piece, C³, to the under side of the axle E, is provided to hold the axle against the strain in operating the machine.

F is the rear axle, having at each end a suitable spindle to receive the carrying-wheels F′, and supporting the rear of the machine, and having the side pieces C″ and center piece, C³, secured thereto by clips, bolts, or otherwise. As shown, a short longitudinal piece, F‴, extends from the rear axle, F, (see Fig. 18,) or rear cross-piece, C⁶, (see Fig. 2,) to the cross girt or piece C of the main frame, for a purpose hereinafter described.

G is a seat for the driver, supported on the upper ends of vertical standards G′ and short brace-pieces G″, extending from the standards to the under side of the seat. A foot-rest, G³, is also provided, located on inclined bars G⁴, which bars also act as braces for the seat, being secured to the vertical standards G′ and to the cross piece G⁵ on top of the main frame. (See Figs. 18 and 19.)

H H′ H″ represent a standard or support, made of cast-iron or other suitable material, secured to the forward end of the frame-piece C″, which lies adjacent to the plow-beam A, by means of bolts or otherwise, so as to have the portion H project above the frame-work and the portion H″ below it. The upper end of the portion H is forked or slotted, and has located thereon a grooved pulley, h, the journal or pivot of which has its bearing in the sides of the fork or slot in which it is located, and, as shown, stirrups or straps h′ are provided, either formed with the fork for the pulley or independent and suitably secured thereto, which straps or stirrups form guards to prevent accidental displacement of the chain which runs over the pulley. The lower end, H″, of the standard is provided with a series of holes, h″, to receive a clevis-pin, by means of which a hitching-clevis is attached, as usual. These holes h″ also receive the forward end of the draw-chain h³ direct or through the clevis, the end of the draw-chain of the clevis-pin being placed in that one of the holes which gives the proper draft for the running depth of the plow. The rear end of the draw-chain extends back and is attached to the plow-beam by means of a suitable ring or eye, h⁴, and it will be noticed that when thus attached the draw-chain does not run in a line parallel with the plow-beam, but in a line diagonal thereto, so that the tendency of the draw is slightly inward or toward the machine, by which means a resistance to the pressure of the soil on the mold-board in use is provided, and by thus placing the draw-chain so that it has a diagonal draw the result is that the pin d″, attaching the inner end of the supporting-bar B to its hanger D, is drawn toward the outer end of the slot in the hanger, and at the same time the pressure of the earth against the mold-board tends to draw the pin in the opposite direction toward the inner end of the slot, thus equalizing the draw on the pin and taking the strain from off the hanger, thereby lessening the danger of breakage of the hanger in use, which might occur if the strain on the plow was not counteracted by the strain of the draw-chain in the opposite direction. It will thus be seen that the effect of the two opposing forces holds the plow to its work, and at the same time allows a perfect freedom and ease of movement, by which the plow lines and adapts itself entirely to its work independent of the body of the machine, greatly lightening the draft, preventing breakage of the plow or its connections, allowing the plow to dodge in case of contact with roots, stones, or other obstructions, and at the same time leaving it free to rise and fall to adapt itself to any inequalities which there may be in the ground, which last result is largely produced by means of the flexible support given the plow-beam through the pivoted or movable suspended bars B B′ and their connections to the frame of the machine and the plow-beam, as already described. As already stated, the bracket or plate b forms a connection between the plow-beam and the suspending-bar B, which permits of the ready adjustment of the plow to any desired angle, and this changing of the angle at which the plow stands is rendered necessary among other reasons from the fact that in plowing sod-ground the plow must be set so as to turn the first furrow completely out, and then reset to do the required work of ditching; and, also, in finishing deep ditches the set of the plow has to be changed in order to have the plow work properly at the bottom of the ditch.

I is a post or standard secured at its lower end by bolts or otherwise to the inner face of the side piece C″ adjacent to the plow-beam, and having secured to its upper end a socket or head, I′, having two arms or extensions, I″ I³. The arm I″ has a circular head, i, which forms a box or bearing for a shaft, i′, on the inner end of which is secured a hand-wheel, i″. The outer end of the shaft extends some distance beyond the end of its box or bearing i, and to its outer end is secured one end of a chain, $i^3$, which chain passes over the pulley $h$ on the upper end of the standard H, and is attached at its other end to an eye or ring, $i^4$, secured to the forward end of the plow-beam or to the fork or plate $A^5$, which carries the caster-wheel $A^4$. This chain or rope $i^3$ raises the front end of the plow-beam by the operator taking hold of the hand-wheel $i''$ and winding the chain or rope on the shaft $i'$, which acts as a windlass for this purpose, and the chain is prevented from slipping off from the pulley-wheel $h$ by the guards or protectors $h'$. When the forward end of the beam is to be lowered the operator allows the cord or chain to unwind from its windlass the extent required for the adjustment. When the forward end of the plow-beam has been raised or lowered to give the plow the required running depth it is held from further downward movement by locking the wheel $I''$ by means of a suitable catch or lock located on the journal box or bearing or otherwise. The other arm, $I^3$, is provided at its end with a circular head, $j$, which forms a journal-box for one end of a shaft, $j'$, the other end of which is supported in a suitable opening or bearing, $j''$, formed in the arm $I''$, and on the end of the shaft which projects beyond the box or bearing $j$ is located a hand-wheel, $j^3$. The shaft $j'$ has attached thereto one end of a rope or chain, $j^4$, the other end of which rope or chain is attached to an eye or ring, $j^5$, on the rear end of the plow-beam. By means of this rope $j^4$ and the shaft $j'$ and hand-wheel $j^3$ the operator can raise or lower the rear end of the plow-beam by winding or unwinding the rope or chain on the shaft, the winding of the rope or chain on the shaft or windlass raising the plow-beam, and the unwinding lowering the plow-beam, and when the rear end of the plow-beam has been raised or lowered to have it and the forward end correspond in height, or nearly so, it is locked from further downward movement by a catch, $j^6$, pivoted to the side of the arm $I^3$, so as to swing in an arc of a circle that will bring it, when thrown inward, into a position to engage the spokes of the hand-wheel, and it is disengaged from the spokes by means of the extension $j^7$, which forms a handle to be grasped by the operator, who, by turning the wheel backward slightly, can throw the stop outward, so that the wheel is free to turn. This form of stop acts directly against the spokes of the wheel, and thereby saves the expense of an extra ratchet-wheel attached to the shaft and a pawl to engage therewith and form the stop, although such ratchet and pawl could be provided and used, if desired. By means of the hand-wheels $i''$ and $j^3$ and shafts $i'$ and $j'$, with the chains or ropes $i^3$ $j^4$, a single operator, standing on the platform D, can readily and quickly raise or lower the plow-beam, as all that is necessary to be done is to wind or unwind the chains and lock the wheels when the desired adjustment is reached.

J represents vertical posts or standards on the delivery side of the machine and extending above the frame-work, and having at their upper ends a cross-bar, J', suitably secured thereto by bolting or otherwise, from which cross-bar extend down diagonal brace-bars J'', the lower ends of which are secured to the side piece C'' on the plow side of the frame. These posts and bars J J' J'' form the frame-work to support the devices by which the carrying belt or apron is raised or lowered.

K represents side pieces or bars of the belt or apron frame, located beneath the frame of the machine.

K' represents side pieces forming a secondary frame for the belt or apron beneath the frame of the machine. This frame K' is located above the frame K, and is supported on the frame K at the delivery side by a raised cross-bar, K'', and by intermediate cross-bars, $K^3$, between such cross-bar K'' and receiving end of frame K. The under side of the side pieces K have secured thereto cross-bars $K^4$, on which are secured longitudinal metal bars $K^5$, forming an open bottom, above which the under side of the carrying apron or belt passes. This open bottom prevents the belt or apron from coming in contact with the ground, and also allows the dirt or earth caught on the belt to pass, so that any accumulation beneath the belt or apron is prevented and the belt or apron given a free travel over the bottom of the frame. This is very desirable, as it allows perfect freedom of travel for the belt without danger of becoming clogged or impeded by an accumulation of dirt or earth, which is liable to be the case where a close bottom is used, and at the same time the open bottom prevents wear of the belt or apron by coming in contact with the ground to a greater extent than if a close bottom was used. The frame K supports the secondary frame K', and is itself supported at the delivery side of the machine by straps or bars $k$, one at each side of the frame. These straps $k$ are attached at their lower ends to their respective side pieces K, and their upper ends are pivoted to the cross pieces or girts C C' by a suitable bolt, $x$, and, as shown in Fig. 3, the upper end of each strap is provided with a series of holes for the passage of the bolt, by means of which the end of the frame can be set to occupy a higher or lower plane and hold the apron a greater or less distance above the ground. On each side of the frame K is a rod or bar, $K^6$, the lower end of which is attached in any suitable manner to the delivery end of the frame-piece K. As shown, the lower ends of the straps $k$, and the lower ends of the bars or rods $K^6$, are pivotally attached to the same pin or bolt, which, in the form of construction shown, is the end of the end bar, K''; but these straps and bars could be attached independently and in some other manner. These straps or bars $K^6$ extend in a diagonal direction upward, and their opposite ends are each attached to a crank, $k'$, which cranks are located on a cross-shaft, $k''$, mounted in suitable bearings, $k^7$, on the upper edge of the cross-girts C C', and to the end of this shaft, adjacent to the platform D, is secured a lever, $k^3$, arranged to engage with a segmental rack, $k^4$, by means of which lever and rack the shaft $k''$ can be partially rotated forward and back to raise and lower the cranks $k'$, and, through the rods $K^6$, move the frame K K' in or out to raise and lower the apron to a slight degree, and thereby secure the proper relation between the plow, the apron, and the ground. These side bars K', when the lever $k^3$ is locked to the rack $k^4$, act as brace-bars to hold the frame firm against any pressure of the dirt in being thrown onto the apron or belt from the plow, and by setting them diagonal they act to prevent upward movement of the frame at the delivery side of the machine. The front or receiving end of the frame and apron is raised through the ropes or chains $k^5$, one attached to each side piece K by a hook or eye, or otherwise, at the lower ends, which ropes extend up and are secured in any suitable manner to a shaft, $k^6$, supported in suitable bearings, $k^9$, on the diagonal bars J'', which shaft has on the end adjacent to the platform D a hand-wheel, $k^8$, by means of which the shaft can be revolved by the operator to wind or unwind the ropes or chains $k^5$, the winding of the ropes or chains on the shaft raising the receiving end of the frame and apron, and the unwinding lowering it, and when the desired adjustment of the apron is reached the hand-wheel is to be locked by a suitable catch or pawl to maintain the apron in its adjusted position. The front ends of the bars $K^6$, as shown, are provided with holes, by means of which the connection with the crank can be made to correspond with the connection of the straps $k$ at their upper ends to the cross-girts, so that the frame and apron will lie in a horizontal position.

L L L' L' are side pieces forming the continuation of the main frame K. This continuation is made in two sections, as shown, joined at their abutting ends by plates $l$ (see Fig. 5) and suitable bolts, the plates, as shown, having flanges to come on the upper and lower sides of the pieces. (See Fig. 6.) Above these side pieces L L' and supported thereon by cross-pieces $L^3$, are secondary side pieces L'' corresponding in position to the secondary pieces K' of the main frame, and these secondary pieces K' L'' form side guides for the apron or belt to cause it to run straight. The side pieces L L' are braced, as shown, against side pressure by a diagonal cross-brace, $L^4$, running from the cross-pieces $L^3$ of the respective frames, as shown in Fig. 5. The inner ends of the first section of the extension of the belt or apron frame is pivotally connected with the lower ends of the uprights J by a suitable hinge, which hinge, as shown, is formed by plates $l'$, bolted to the end of the section, and plates $l''$, bolted to the side of the uprights J, with a pin or pivot passing through the projecting ends of the plates $l'$ $l''$, as shown in Fig. 5, and, as shown in Fig. 5, a backing-plate, $l^3$, is provided to form, in connection with the plate $l'$ and the attaching-bolts, a socket for each side piece of the frame. The extension or delivery portion of the belt-frame is made in two sections, for the purpose of enabling the frame to correspond in length to the width of the highway or road being constructed, as a different length of belt or apron is required for narrow or wide highways or roads in order to deliver the dirt properly. When making a wide highway or road, two or more sections of the frame-extension are to be used, the first section being connected to the uprights J J, as just described, and the next section attached to the first section by the plates $l$, as described. For making a narrow road, the first section, L, is to be removed, and the end of the second section, L', is inserted in the socket formed by the plates $l'$ $l^3$ and the attaching-bolts, so that such section will take the place of the section removed; and this change can be readily made, as all that is necessary to be done is to unbolt the plates $l$, so that the second section can be slipped therefrom, and loosen the bolts of the socket formed by the plates $l'$ and $l^3$ and slip the first section out and insert the second section, and again tighten the bolts.

M is the conveyer belt or apron, which is made with an interposed section, M', (see Fig. 13,) having at one end straps $m$, and at the other end buckles $m''$, and the ends of the main belt or apron are respectively provided with buckles $m'$ and straps $m^3$, so that the interposed section can be united with the main belt or apron by buckling the straps $m$ to the buckles $m'$ and the straps $m^3$ to the buckles $m''$, making a continuous belt or apron. This interposed section is to be used when the entire length of extended or delivery frame L L' is used, and when one section of the extended frame is used the interposed belt-section M' is unbuckled and removed and the ends of the main section buckled together, so that the belt or apron will correspond in length to the length of the frame. The manner of constructing the conveyer apron or belt with the interposed section is shown in Fig. 13, and the length of the interposed section must be proportionate with that of the removed section of the frame, in order to keep the relative length of the belt and frame correct. The apron or belt is mounted on rollers M'' and $M^4$, one of which, M'', is at the receiving end of the main frame and is supported in suitable bearings on the side bars K and the other, $M^4$, is at the delivery end of the section L' of the extended frame, and is mounted in suitable bearings on the side bars L', and this roller $M^4$ is of greater diameter than the first roller, M''. A third roller, $M^3$, is provided, located in suitable bearings on the side bars K at the delivery end of such bars, which roller is for the purpose of preventing sagging of the belt at the juncture of the main and extension frames, as shown in Fig. 3, over which roller $M^3$ the belt or apron travels, and the upper surface of the belt is supported on a series of rollers, $M^5$, mounted in suitable bearings in the side pieces K' and L″ of the main and extension frames, two rollers, as shown, being located in each frame; but more can be used, if desired, their object being to prevent the belt from sagging when the dirt is being carried thereon, and also to give the belt a better and easier travel in doing its work. The dirt is retained on the belt while traveling across the main frame by side strips M⁶, (see Fig. 3,) one on each side of the belt, secured by iron straps or otherwise to the side pieces K′ in such manner as to just clear the upper face of the belt and be in line to have the edge of the belt pass thereunder. The apron or belt, as shown in Fig. 13, is provided with cross strips or cleats m⁴, which may be made of narrow strips of rubber, or of some other suitable material which can be sewed, riveted, cemented, or otherwise fastened to the belt, which strips m⁴ act to cause the belt to catch and hold the dirt when working in soft or mealy soil, in which soil a belt with a smooth surface or face might fail to take hold, so as to hold the dirt and carry it to the point of delivery. The roller M″ at the receiving end of the belt or apron is made of small diameter, in order to allow the conveyer-belt to lie as close to the ground as possible, in order to receive the dirt from the plow, and the roller thus located is liable to gather soft or sticky dirt, which the action of the belt in passing thereover tends to compact onto the surface of the roller, which accumulation in time would materially increase the size of the roller, forcing the belt nearer to the plow, so that the dirt will fail to pass thereon, and also producing more or less clogging of the belt in passing around the roller. This sticking of the dirt to the roller, and its accumulation thereon, is prevented by a scraper, M⁷, (see Figs. 14 and 15,) made of a strip of metal or other suitable material, and secured to the inner edge of a board or plate, M⁸, in such position as to stand at an angle for its working-edge to engage or come in contact with the face of the roller and take the dirt therefrom and deposit it on the plate or board M⁸, from which it can be cleaned off readily after the machine is stopped. At each end of the board or plate M⁸, (see Fig. 14,) and secured thereto in any suitable manner, are plates or straps of metal m⁵, having at one end a suitable hole to receive the shaft or journal m⁶ of the roller M″, which journals are carried on the end of the frame-pieces K. This construction and mode of attaching the board or plate M⁸ with the scraper M⁷ keeps the scraper in correct relation to have it act on the roller M″, and this relation will be maintained irrespective of the wear of the journals in their boxes, as the attaching-plates m⁵ are between the journal-bearings and the ends of the roller. The board or plate M⁸, when the parts are together, lies above the frame-pieces K and between the upper and lower surfaces of the belt, so that it cannot drop down or interfere in any manner with the operation of the belt or conveyer, and the dirt, as it is scraped off by the action of the plate M⁷, falls onto the board M⁸ out of contact with the belt. (See Fig. 15ᵃ, in which the relative positions of the belt, scraper, and roller are shown.)

Blades or scrapers have heretofore been applied to the rollers of ditching-machines and other like apparatus for removing dirt from the same, and I do not broadly claim such as my invention, but only the peculiar construction and arrangement as above described, and hereinafter specifically pointed out in the claims.

The extension or outer section of the conveyer-frame has to be raised when the machine is out of use and in traveling from place to place, to do which ropes or chains l⁴ are attached to the side pieces L′, near the outer end, one for each side piece, by a ring, eye, or staple, which ropes are extended back and connected with a shaft, l⁵, mounted in suitable boxes or bearings, l⁶, one on each diagonal brace-bar J″, and this shaft has secured to the end adjacent to the platform D a hand-wheel, l⁷, by means of which the operator can rotate the shaft in either direction to wind or unwind the cord or chain and raise and lower the extension or delivery section of the conveyer-frame, the winding of the cords or chains on the shaft raising the outer end of the frame and the unwinding lowering it, and when the apron or conveyer frame is in a desired position it can be held in position by means of a suitable catch or a dog and ratchet-wheel. The catch shown for this purpose is of peculiar construction, and is illustrated in detail in Figs. 16 and 17, and consists of a catch, l⁹, made of wrought-iron or other suitable material, bent to have its ends in parallel planes, as shown in Fig. 16. One end of this catch l⁹ is pivoted between ears l⁸ on the journal-box adjacent to the hand-wheel at such a point as to have the opposite parallel ends, when the latch is turned inward, engage with the spokes or arms of the wheel at a point near the hub, and the inclination of the wheel when caught by the catch is to draw the catch more firmly against the face of the journal-box as the wheel is turned, which result is attained from the fact that the acting end of the catch acts against the arms of the wheel in a different radial line from that in which the pivoted end is held in the ears l⁸. It will also be noticed that the catch acts only to prevent a backward movement of the wheel, and is non-acting, like an ordinary pawl, in a forward movement of the wheel, the acting end being elevated by the engagement of the arms of the wheel and dropping back into position after each arm passes, so that the operator need pay no attention to the catch, as it is always in position to stop backward rotation and to allow forward. This form of catch can be used upon all of the hand-wheels, if so desired, except the wheel j³, on which wheel the lever-catch j⁶ j⁷ is used, the object being to enable the operator to release the wheel instantly by taking hold of the hand portion $j^7$.

N N', Figs. 2 and 5, is a divided driving-shaft, through which and suitable gearing the roller M⁴ is driven to impart motion to the belt. The sections of this shaft are joined together by a hollow coupling, $n$, one section of which is attached to the end of N and the other to the end of N', and the length of the section N' corresponds to that of the section L of the delivery-frame, so that when this section of the frame is removed the shaft-section N' can also be removed, leaving a shaft of a length corresponding to the length of the remaining section of the frame. The end of the shaft-section N has secured thereon a beveled pinion, $n'$, which meshes with a corresponding pinion, $n^2$, on the end of the shaft M⁹ of the roller or drum M⁴, and the inner end of the shaft-section N' has secured thereto one section of a universal coupling, the other section of which is secured to the shaft N'', which shaft has its bearings in suitable boxes secured to the side piece C'' of the main frame and the frame-piece F''', as shown in Fig. 2, and this universal coupling is arranged in such relation to the hinges for attaching the frame L L' to the machine as to have its center of motion in line with the pivot for the hinged plates, as shown in Fig. 5, so as not to interfere with the raising and lowering of the conveyer or belt, the universal joint permitting such raising and lowering without displacement of the driving devices.

In shortening the conveyer the section N' of the driving-shaft is to be slipped from the universal coupling $n^3$, and the hollow coupling $n$ disconnected, and the end of the shaft N inserted in the universal coupling $n^3$, shortening the shaft to correspond to the length of the conveyer. The outer end of the shaft-section N, as shown, is supported in an arm or plate, L⁵, which, as shown, is a continuation of the cross-pieces L³, but might be an independent piece suitably secured to the side rail L' of the frame.

O is a gear-pinion, keyed or otherwise secured to the shaft N'' and meshing with a larger gear-wheel, O', keyed or otherwise secured to a shaft, O'', which is mounted in suitable boxes attached to the side pieces C'' of the frame, the shaft O'' extending entirely across the frame of the machine, with its ends projecting beyond the side pieces, as shown in Fig. 2.

Figure 11:
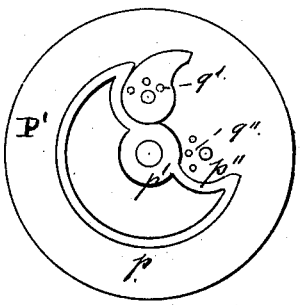
Figure 12:

P is a clutch-box, secured to each projecting end of the shaft O'' and adjacent to a gear wheel or pinion, P', which meshes with an internal gear, P''', secured to the inner faces of the spokes of the carrying-wheels C⁶, one for each wheel, as shown in Figs. 1 and 2, so that as the machine moves forward the internal gear will be carried around with the wheels, imparting rotation to the pinions P', driving the shaft O'', and, through the gear-wheel O' and gear-pinion O, rotating the shaft N'', which in turn drives the shaft N N', by which the belt or conveyer is driven from the drum or roller M⁴. The clutch-box or ratchet-drum P has on its interior periphery a series of ratchet-teeth, $o$, with which a pawl, $o'$, engages, which pawl is secured to the face of the pinion P' by a pin or pivot, $o''$. (See Fig. 9.) The face of the pinion P', to which the pawl $o'$ is attached, is provided with a semicircular flange, $p$, having about the same thickness or projection as the thickness of the pawl, which flange, at its terminal points, is curved or bent inward and joined to the hub or center $p'$ of the pinion to form semicircular openings $p''$, corresponding in shape and diameter to the heel of the pawl to receive such heel, and form a bearing therefor to relieve the pin or pivot $o''$ from the heavy strain which comes on it in driving the pinion $p'$ from the interior gear. As shown, two cavities, $p''$, are formed; but one will ordinarily be sufficient, two being provided for the purpose of enabling a right or left hand pawl to be used, thus saving the use of two patterns in forming the gears. The pawl $o'$ is held in engagement with the ratchet-teeth $o$ by a spring, $q$, located between the face of the pawl and the face of the pinion P', one end of the spring entering one of a series of holes, $q'$, in the pawl and the other one of a series of holes, $q''$, in the pinion-plate, as shown in Fig. 11, the object of which is to give the spring a greater or less tension, as required, for operating the pawl. As shown, the heel of each pawl is provided with an opening or socket, in which the spring is located. This ratchet-connection between the gear-pinions and the shaft which they drive is necessary in order to prevent damage to the machinery when the machine is backed and to enable the machine to be turned, as in turning, one wheel travels faster than the other, so that some provision for the necessary slip must be provided.

Q is a sliding clutch located on the shaft O'', and arranged to engage with the hub of the wheel O' and lock such wheel, which is mounted loosely on the shaft, to the shaft, so as to revolve therewith.

R is a forked arm or lever, a fork of which receives the sliding clutch Q, so that by swinging the lever through the rod or link R' and lever R'' the clutch can be thrown into engagement with the gear-wheel or be disengaged therefrom, the disengagement being for the purpose of stopping the movement of the gear-wheel when the machine is moving from place to place and not in use.

By the means described of connecting the plow-beam with the adjustable hinge-plate and the supporting-bar a flexible connection is provided which allows the plow-beam a slight independent backward and forward movement, without affecting its support.

By using independent swinging bars for supporting the plow-beam at its front and rear ends, and connecting such bars with the beam by an adjustable connection and a loose connection, it will be seen that the plow has a perfect freedom and ease of movement and can adapt itself to the work, producing better results and more perfect work than by the old plan of rigid guides between which the plow-beam worked; and by providing a slotted hinge-connection between the plow-beam and one of its supporting-bars the adjustment of the plow to the lay of the ground and the work required is readily and quickly made.

By using the slide D'', the liability of the plow to run out from the toughness or hardness can only occur when the entire body of the machine is raised.

By arranging the several hand-wheels as shown and described, an operator standing on the platform D has the entire mechanism under his control, so that he can raise and lower either end of the plow-beam independent of the other, and raise or lower the apron as required for use or in traveling from place to place, and the arrangement is such that the same operator can apply the friction brake or clamp to hold the plow down to its work.

By using a delivery or extension frame and a driving-shaft made in sections, both of which are capable of being readily disconnected, so as to move one section and attach the other remaining section in position for use, a change of the delivery to suit the width of roadway can be quickly and easily performed.

In lowering, it is to be understood that the catches for the several hand-wheels are to be thrown back, so as not to interfere with the backward revolution of the wheels.

What we claim as new, and desire to secure by Letters Patent, is—

1. The transverse swinging bars B B', independent of each other, pivotally attached at their inner ends and carrying at their outer ends a plow-beam and plow for enabling the machine to travel over uneven surfaces without disturbing the running depth of the plow, substantially as specified.

2. The independent swinging bar B, pivotally connected at its inner end and provided at its outer end with the bracket or plate $b$, having curved slots, in combination with a plow-beam and a connection therefor with the plate or bracket $b$, for changing the angle or set of the plow, substantially as and for the purposes specified.

3. The independent swinging bar B, pivotally connected at its inner end and provided at its outer end with the plate or bracket $b$, having a circular slot or slots, in combination with the plow-beam A, plate $c$, bolt $c''$, for connecting the plow-beam to change the angle or set of the plow and allow free vertical play at the rear end, substantially as and for the purposes specified.

4. The independent swinging bar B, hanger $d$, having slot $d'$, pivot $d'''$, plate or bracket $b$, having ears $b'$ and slots $b^5$, pivot-bolt $b^3$, clamping bolt or bolts $b^4$, in combination with the plow-beam A, plate $c$, having ears $c'$, bolt $c''$, and clamping-bolts $c^4$, substantially as and for the purposes specified.

5. The independent swinging bar B', hanger $f$, pin or pivot $f'$, hook or catch $e^3$, in combination with the plow-beam A and arm or bracket $e$ for attaching the plow-beam at the front end, substantially as and for the purposes specified.

6. The swinging arms B B', hangers $d f$, pins or pivots $d'' f'$, bracket or plate $b$, having curved slot or slots $b^4$, pivot $b^3$, bolt or bolts $b^5$, plate $c$, bolt $c''$, clamping-bolts $c^4$, hook or catch $e^3$, and arm or bracket $e$, in combination with a plow-beam carrying a plow for suspending the plow-beam independent of the frame of the machine, substantially as and for the purposes specified.

7. The diagonal draw-chain $h^3$, in combination with the plow-beam A and independent swinging bar B, for resisting the strain on the pivot of the bar B from the pressure of earth in use, substantially as specified.

8. The slide D'' and foot-treadle D', having an eccentric or cam head, $g$, in combination with bar B and the plow-beam, substantially as specified.

9. The standard or support H H' H'', in combination with the plow-beam A, draw-chain $h^3$, pulley $h$, and elevating chain or rope $i^3$, for furnishing an attachment for the draw-chain and a support for the pulley for elevating the plow-beam, substantially as and for the purposes described.

10. The post or standard I, having the head I', with arms I'' I$^3$ to furnish bearings for the shafts $i'$ and $j'$ and support for the hand-wheels, substantially as and for the purposes specified.

11. The side delivery or extension frame made of two sections, L L', detachably connected by plates or angle-irons $l$, in combination with the hinge-plates $l'$ $l''$ and vertical posts J, for lengthening or shortening the delivery to the width of roadway and allowing the delivery-frame to be raised and lowered, substantially as and for the purposes specified.

12. The side delivery or extension frame consisting of two sections, L L', detachably connected by plates or angle-irons $l$, and secondary frame formed of unattached side pieces L'', carrying-rollers M$^5$, and a driving drum or roller, M$^4$, carried by the outer section of the frame for furnishing a support for a conveyer or apron that can be lengthened or shortened for delivery on roadways of different widths, substantially as specified.

13. The side pieces K, in combination with the transverse bars K$^4$ and longitudinal bars K$^5$, which furnish an open bottom frame or support for the under side of the apron or carrier, by which the apron or carrier is kept clean and clogging prevented, substantially as described.

14. The side pieces K, cross-strips K$^4$, longitudinal strips K$^5$, and end bar, K'', in combination with the side bars K', carrying rollers M$^5$, for furnishing a support for a delivery apron or conveyer, substantially as and for the purposes specified.

15. The hangers or straps $k$ and diagonal bars K$^6$, in combination with a frame or support for a conveyer belt or apron for adjusting the height of the belt in relation to the ground and plow, substantially as and for the purposes specified.

16. The hangers or straps $k$, side bars $K^6$, cranks or arms $k'$, and rock-shaft $k''$, in combination with a support or frame for a conveyer belt or apron, substantially as and for the purposes specified.

17. The hangers or straps $k$, side bars $K^6$, cranks or arms $k'$, rock-shaft $k''$, lever $k^3$, and rack $k^4$, in combination with a support or frame for a conveyer belt or apron for changing the relative location of the receiving end of the belt or apron, substantially as and for the purposes specified.

18. The adjustably-suspended frame or support for a conveyer belt or apron having both longitudinal and vertical adjustment, in combination with a plow having a side delivery for locating the plow and belt or apron in the proper relation for the belt or apron to receive the dirt, substantially as specified.

19. The adjustably-suspended frame or support for a conveyer belt or apron, having both a longitudinal and a vertical adjustment, in combination with an adjustable and independently-swinging plow-beam and plow having a side delivery for maintaining the proper relation between the plow and the belt or apron independent of the travel of the machine, substantially as specified.

20. The adjustable frame or support for a conveyer belt or apron, in combination with a plow-beam, A, suspending-bars B B', having adjustment each independent of the other, and a plow having a side delivery and carried by the plow-beam, for maintaining a proper relation between the plow and the conveyer belt or apron under all circumstances, substantially as specified.

21. The combination of a conveyer belt or apron adjustably suspended or carried to have both a longitudinal and vertical movement, with a side-delivery plow independently supported to rise and fall at either front or rear, substantially as and for the purposes specified.

22. The combination of a side-delivery plow carried by a plow-beam supported at its front and rear ends by independently pivoted or swinging bars B B', and a conveyer belt or apron carried by a suspended frame or support having free vertical play at the receiving end of the belt or apron, substantially as and for the purposes specified.

23. The combination of a side-delivery plow and plow-beam and transversely-arranged swinging or pivoted bars B B', supporting the plow-beam at its front and rear ends, substantially as and for the purposes specified.

24. In a grading and ditching machine, the combination of the plow-beam A, the supporting-bar B, and the plate or bracket $b$, having a curved slot or slots, $b^5$, said bracket being connected at one end to the plow-beam and its other end pivotally connected to the supporting-bar, for the purpose of forming an adjustable connection between them, substantially as described.

25. The roller $M''$, in combination with a scraping-plate located within the conveyer-belt and pivoted to the journal of the roller, for maintaining the roller and plate in correct relation to clean the roller, substantially as specified.

26. The roller $M''$, in combination with the scraping-plate $M^7$ and receiving-board $M^8$, carrying the plate and pivotally supported from the journals of the roller, substantially as and for the purposes specified.

27. The side-delivery or extension frame consisting of two sections, L L', detachably connected by plates or angle-irons $l$, in combination with a driving-shaft consisting of two sections, N N', adjustably connected by a coupling, $n$, for readily changing the length of the delivery without changing the driving mechanism, substantially as specified.

28. The side-delivery or extension frame consisting of two sections, L L', detachably connected together by plates or angle-irons $l$, and a driving-shaft consisting of two sections, N N', detachably connected by a coupling, $n$, in combination with a conveying belt or apron having an interposed section, M', substantially as and for the purposes specified.

29. The side-delivery or extension frame consisting of two sections, L L', detachably connected by plates or angle-irons $l$, the outer section carrying the roller or drum $L^4$, side pieces $L''$, carrying rollers $M^5$, and a driving-shaft, consisting of two sections, N N', detachably connected by a coupling, $n$, in combination with a driving-belt having an interposed section, M', substantially as and for the purposes specified.

30. The hand-wheels $i''$, $j^3$, $k^3$, and $l^7$, with their shafts and chains or ropes arranged, as described, for bringing the several raising devices for the plow-beam and the plow and the carrying belt or apron within reach of the operator standing on the machine, substantially as specified.

W. J. EDWARDS.
GEO. B. DURKEE.

Witnesses:
H. H. HARKNESS,
ANGUS CAMPBELL.